United States Patent [19]

Withers et al.

[11] Patent Number: 5,008,836
[45] Date of Patent: Apr. 16, 1991

[54] METHOD OF RECOGNIZING SELECTED OBJECTS

[75] Inventors: Robert W. Withers, Overgaard; Robert H. Johnson, Scottsdale, both of Ariz.

[73] Assignee: Motorola, Inc., Schaumburg, Ill.

[21] Appl. No.: 382,359

[22] Filed: Jul. 20, 1989

[51] Int. Cl.$^5$ .............................................. G06F 15/00
[52] U.S. Cl. .................................. 364/516; 364/562; 364/563
[58] Field of Search ............... 364/516, 565, 569, 562, 364/563; 356/3, 5, 16, 21, 28, 152; 250/560; 382/22; 235/411, 412, 413

[56] References Cited

U.S. PATENT DOCUMENTS 4,011,447  3/1977  Henderson ........................ 250/560
4,319,332  3/1982  Mehnert ............................ 364/516
4,495,589  1/1985  Hirzel ................................ 364/565
4,527,894  7/1985  Goede et al. ........................ 356/5
4,634,271  1/1987  Jano et al. ......................... 356/5

Primary Examiner—Parshotam S. Lall
Assistant Examiner—Ellis B. Ramirez
Attorney, Agent, or Firm—Frank J. Bogacz; Jordan C. Powell

[57] ABSTRACT

A method of recognizing a selected object during a fly-over including periodically making range measurements to the ground at a predetermined angle, noting range rate of change from adjacent range measurements, determining the presence of an object, its height and width from the range rate changes and comparing the measured figures to stored figures to recognize a selected object.

4 Claims, 2 Drawing Sheets

METHOD OF RECOGNIZING SELECTED OBJECTS

FIELD OF THE INVENTION

The present invention pertains to a method of recognizing selected objects during a fly-over, and more particularly to a method of finding the center of an object such as an enemy tank and detonating a projectile at the center.

BACKGROUND OF THE INVENTION

In many instances, it is desirable to be able to differentiate selected objects from natural terrain and the like. As an example, during battles, it is desirable to be able to recognize enemy tanks in terrain including walls, houses, hill, etc.

At the present time, armored vehicles, such as tanks, have been developed to the state that direct attack weapons are generally ineffective. It is, therefore, more desirable to attack such vehicles from above where the most vulnerable area and a hit anywhere in the central two-thirds of the tank top will provide the highest probability of a kill. Thus, the major problem to solve is to develop a projectile that can recognize a selected object, such as an enemy tank, and can then find the center of the top and impact or detonate in that area.

SUMMARY OF THE INVENTION

Accordingly, it is an object of the present invention to provide a new and improved method of recognizing selected objects during a fly-over.

It is a further object of the present invention recognize a selected object and determine the center of the top of the selected object.

These and other objects are realized in a method of recognizing, during a fly-over, selected objects having a known height and width, comprising the steps of periodically measuring the range to the ground, comparing adjacent measurements to determine changes in range, using the time between measurements to calculate speed, comparing the calculated speed to a known speed and indicating an object when the speeds are approximately equal, measuring the time from a first change in range, after which an object is indicated, to a second subsequent change in range to determine the height of the object, comparing the measured time/-height to the known height to determine if the height of the object is an acceptable height for the selected object, measuring the time from the second subsequent change in range to a third subsequent change in range to determine the width of the object, and comparing the measured width of the object to the known width to determine if the object is the selected object.

The center of the object can then be found by dividing the width of the object by two or by measuring a predetermined distance from the first edge.

BRIEF DESCRIPTION OF THE DRAWINGS

Referring to the drawings.

DETAILED DESCRIPTION OF THE PREFERRED EMBODIMENT

Figure 1:
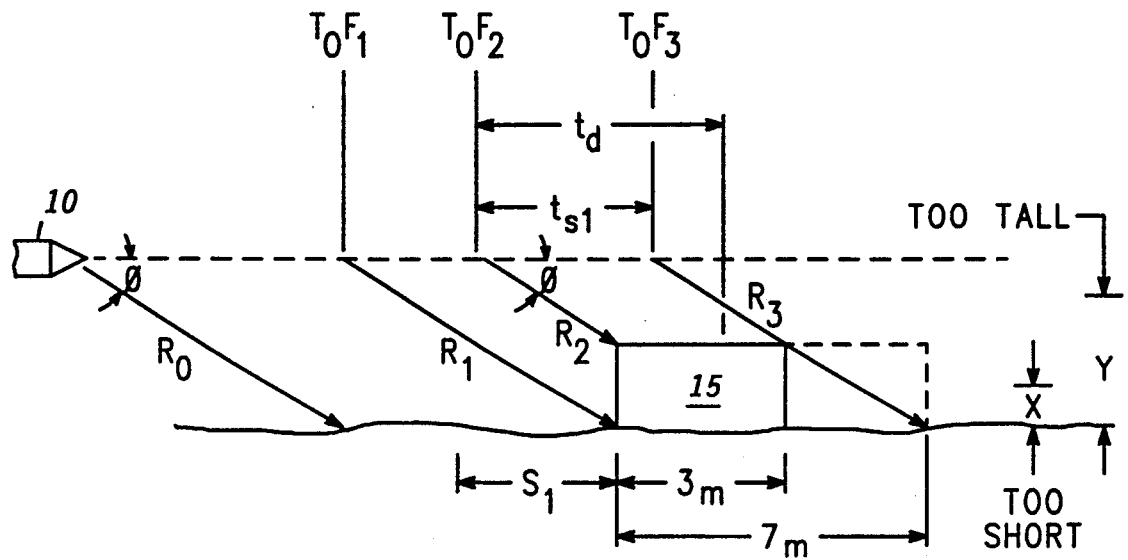
FIG. 1 is a vector diagram of a projectile fly-over.
Figure 1:
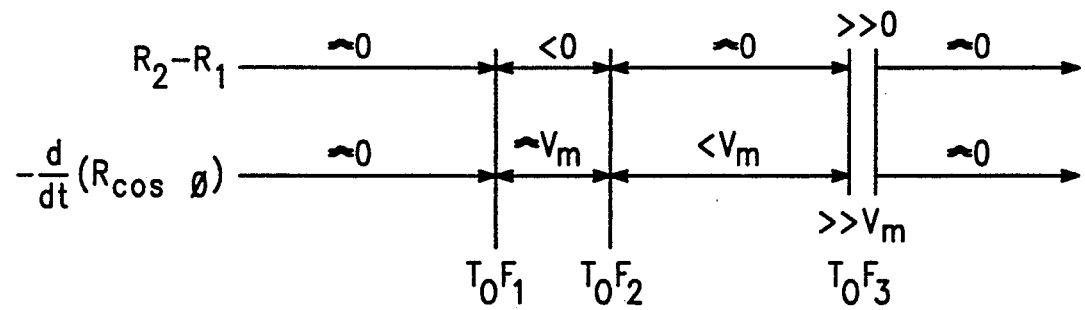

Referring specifically to FIG. 1, a projectile 10 is illustrated in a typical fly-over pattern with an object 15. Projectile 10 may be any of the many types of projectiles used in combat, such as the type fired from a gun, a missile fired from a moving vehicle or airplane, or a self-propelled rocket. Further, it will be understood by those skilled in the art that many other uses may be devised for the recognition of selected objects and the specific example described herein is only for purpose of illustration.

In the present embodiment, projectile 10 contains an optical sensor including a transmitter and receiver operating in the near infrared region of the optical spectrum. For simplicity it will be assumed that projectile 10 is non-spinning, but it will be understood that through the use of additional sensors, timing, etc., the present invention could be incorporated on a spinning projectile. Also, it will be clear that devices other than optical sensors might be used. The transmitter beam and the receiver field-of-view are directed downward at a fixed angle $\phi$. The transmitter is pulsed so that the emissions are reflected from the surface of the ground, or other objects, in the receiver's field-of-view and produce electrical pulses in the receiver. The elasped time between the transmitted pulse and the received pulse is proportional to the range to the reflecting object.

The assuming straight and level flight, signals reflected from the ground will be at a relatively constant range, as illustrated by vector Ro in FIG. 1. A vertical surface, however, such as the front edge of object 15, will result in the rate of change of the range being proportional to the velocity of projectile 10, as illustrated by vector R1. This is utilized as an object (target) identification feature. As the transmitted beam reaches the top of the vertical surface, the rate of change will be reduced substantially, as illustrated by vector R2, thereby indicating that the front edge of obstacle 15 has been detected. The time elasped between initial detection (TOFI) and edge detection (TOF2) is a measure of the height of the object.

Utilizing the range and the known angle $\phi$ together with projectile 10's velocity, the distance to object 15 is calculated. In the present embodiment, this calculation is performed in an inexpensive microprocessor using stored a priori velocity (as a function of time-of-flight, TOF) information. The microprocessor then calculates the time remaining for projectile 10 to be directly over the front edge of object 15 and adds the time to additionally be over the center of a minimum size target. i.e. approaching the target from the side.

As projectile 10 continues to approach object 15, the transmitted beam illustrated as vector R3 reaches the far edge, resulting in an abrupt change in the rate of change of the range information. The elasped time from the initial edge detection (TOF2) to the far edge detection (TOF3) is a measure of the width of object 15. If this time is too short (a wall or hedge, for example) for object 15 to be an enemy tank (the selected object), the microprocessor extends the delay proportionately until the far edge is detected. Generally, a selected object, such as an enemy tank, will be longer than it is wide. Thus, when approaching the object from the front or back it will appear wider than when approaching from the side. Because of this and other possible variations, the accepted width of a selected object will generally be in a range from a minimum to a maximum.

Figure 2:
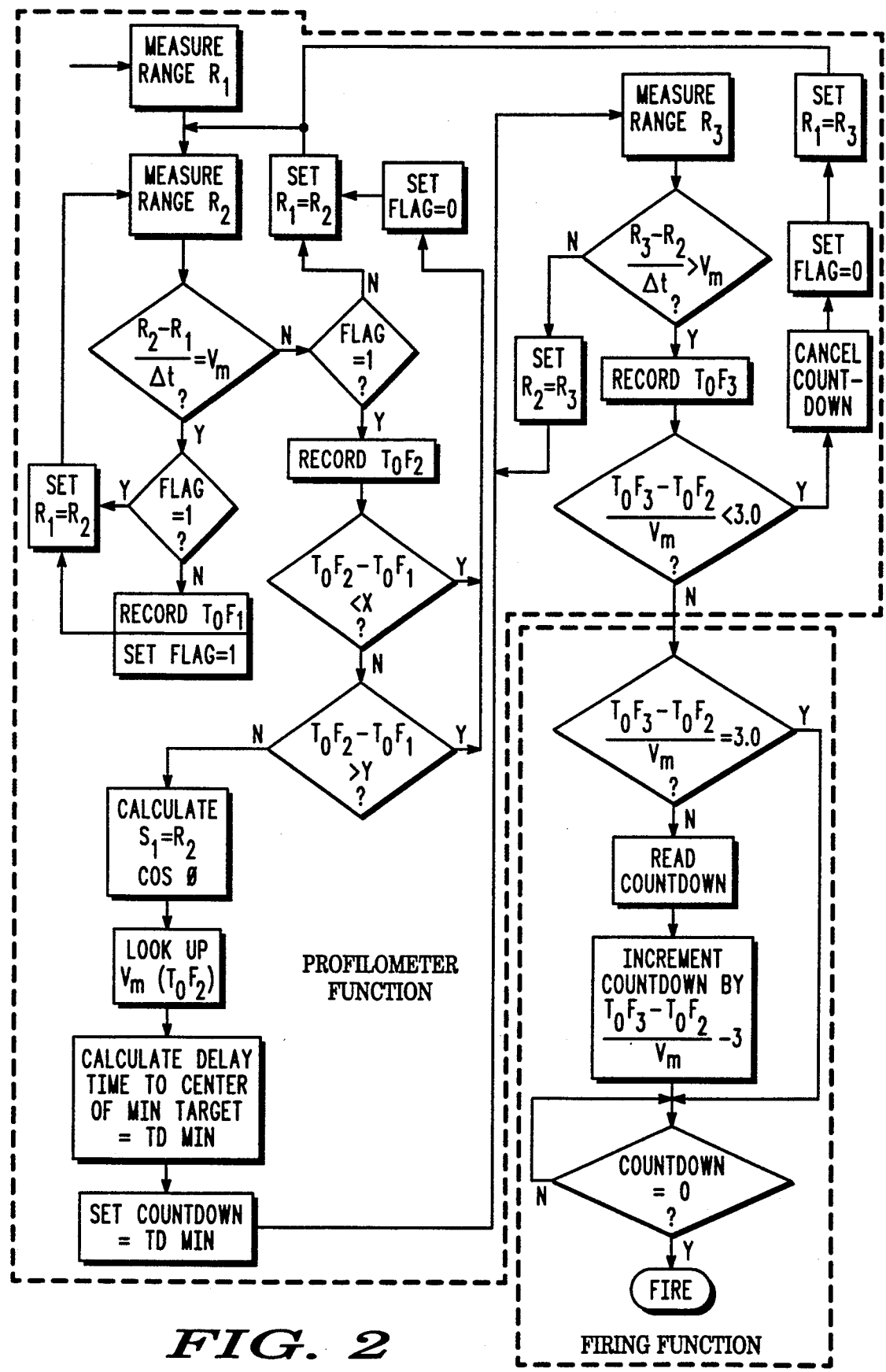
FIG. 2 is a logic flow chart embodying the present inventive method.

The microprocessor is used to organize and control the safing, arming and fuzing functions of projectile 10. FIG. 2 is a flow chart showing the sequence of the control, calculation and decision processes. This insures the safety of the operator and initiates the warhead at the optimum time for maximum probability of kill of object 15.

When power is applied to the fuze of projectile 10, the optical sensor begins to measure range to any obstacle within its field-of-view. Using the range measurements from the latest pulse (R2) and the adjacent preceding pulse (R1) together with the time between pulses a measure of velocity is calculated. This velocity is compared with a priori projectile 10 velocity (as a function of TOF) to implement the present algorithm.

When the front vertical surface of object 15 is encountered, the calculated velocity is approximately the same as the velocity of projectile 10. This initiates the sequence for measuring the height of object 15. TOF1 is recorded and compared with the time (TOF2) when the top of object 15 is encountered. This point is sensed when the measured velocity becomes less than the stored velocity of projectile 10. If the height is insufficient to be a selected object (TOF2−TOF1<X) or too tall to be a selected object (TOF2−TOF1>Y) the flag is reset and the measurements continue as before.

If the height condition is satisfied, the microprocessor calculates the distance to object 15 (S1=R2COSφ), and calculates the time to reach the center of the minimum size selected object. This calculation is then used to initiate a time delay counter.

The apparatus then proceeds to determine the width of object 15. As previously described in conjunction with FIG. 1, the range becomes suddenly greater as the the optical transmitter beam passes the far edge of object 15. At this point TOF3 is recorded. TOF3−TOF2, then, is a measure of the width of object 15. If the width is not sufficient to be selected object, the delay timer is disabled. The measurement sequence is also re-initiated and continues until a selected object is encountered. If the far edge of object 15 has not been reached by the time a maximum width would have been encountered, the delay timer is disabled and the measurement sequence is re-initiated.

With all of the conditions for a selected object satisfied, projectile 10 is initiated at the end of the calculated delay time, at the moment projectile 10 is centered over object 15. This ensures maximum probability of kill.

In case no selected object is encountered, or if projectile 10 hits object 15 instead of flying over it, an impact switch is incorporated to fire projectile 10. Thus, an armed projectile will be destroyed upon impact with the ground at the end of its flight. In the direct hit case, the maximum effect of the projectile may not be achieved, but at least some damage will be inflicted on object 15.

Thus, an improved method of recognizing selected objects is disclosed. Further, when a selected object is recognized the center of the object can be determined and a projectile can be initiated when it is centered over the object. Since the various parameters defining a selected object are stored in a microprocessor, these parameters can be easily and quickly changed for different selected objects.

While I have shown and described a specific embodiment of the present invention, further modifications and improvements will occur to those skilled in the art. I desire it to be understood, therefore, that this invention is not limited to the particular forms shown and I intend in the appended claims to cover all modifications which do not depart from the spirit and scope of this invention.

I claim:

1. A method of recognizig, during a fly-over, selected objects having a known height and width, comprising the steps of:
   periodically measuring the range to the ground at a predetermined angle with the surface of the ground;
   comparing adjacent measurements to determine changes in range;
   measuring the rate of change of the range;
   measuring the time from a first change in range, after an object is indicated, to a second subsequent change in range to determine the height of the object;
   comparing the measured height to the known height to determine if the height of the object is an acceptable height for the selected object;
   measuring the time from the second subsequent change in range to a third subsequent change in range to determine the width of the object; and
   comparing the measured width of the object of the known width to determine if the object is the selected object.

2. In conjunction with a projectile, a method of determining the center of a target comprising the steps of:
   firing the projectile so it will fly over a target;
   periodically measuring the range to the ground at a predetermined angle in front of the projectile;
   comparing adjacent measurements to determine changes in range;
   measuring the rate of change of the range;
   measuring the time from a first change in range, after which a target is indicated, to a second subsequent change in range to determine the height of the target;
   comparing the measured height to a predetermined height to determine if the target height is within a predetermined range of heights;
   measuring the time from the second subsequent change in range to a third subsequent change in range to determine the width of the target;
   comparing the measured width of the target to a predetermined width to determine if the target width is within a predeterined range of widths; and
   calculating the center of the target from the measured time between the second and the third subsequent changes in range.

3. In an enviroment where a moving projectile is seeking predetermined objects, a method of detecting an object comprising the steps of:
   launching the projectile over a target area;
   continuously transmitting an optical signal from the projectile to measure a range from the projectile to ground;
   continuously detecting the optical signal as it is received back from the ground;
   determining heights of encountered objects;
   comparing the heights with predetermined minimum and maximum height thresholds;
   determining widths of the encountered objects when the heights are within the predetermined minimum and maximum height thresholds;

comparing the widths with a predetermined minimum width threshold; and generating a target detect signal when the predetermined minimum width threshold has been achieved.

4. A method according to claim 3 wherein the step of determining the heights of encountered objects comprises the steps of:

periodically measuring the range to the ground at a predetermined angle with the surface of the ground;

comparing adjacent measurements to determine changes in range;

measuring the rate of change of the range; and measuring the time from a first change in range, after an object is indicated, to a second subsequent change in range to determine the height of the object.

* * * * *